US010172037B2

(12) United States Patent
Singh et al.

(10) Patent No.: US 10,172,037 B2
(45) Date of Patent: Jan. 1, 2019

(54) LOAD BALANCING IN A DISTRIBUTED GATEWAY DEPLOYMENT

(71) Applicant: CISCO TECHNOLOGY, INC., San Jose, CA (US)

(72) Inventors: Akshya Kumar Singh, Fremont, CA (US); Anil Kumar Chandrupatla, San Jose, CA (US); Aeneas Sean Dodd-Noble, Andover, MA (US); Prasannakumar Murugesan, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 505 days.

(21) Appl. No.: 14/942,695

(22) Filed: Nov. 16, 2015

(65) Prior Publication Data
US 2017/0142613 A1    May 18, 2017

(51) Int. Cl.
*H04W 28/08*    (2009.01)
*H04W 88/16*    (2009.01)

(52) U.S. Cl.
CPC ............ *H04W 28/08* (2013.01); *H04W 88/16* (2013.01)

(58) Field of Classification Search
CPC .................................................... H04W 28/08
See application file for complete search history.

(56) References Cited

U.S. PATENT DOCUMENTS

| 7,191,235 | B1* | 3/2007 | O'Rourke | H04W 28/08 709/227 |
| 8,767,754 | B1 | 7/2014 | Muthuswamy et al. | |
| 8,897,183 | B2 | 11/2014 | Andreasen et al. | |
| 9,003,057 | B2 | 4/2015 | Mahaffey et al. | |
| 2014/0169330 | A1* | 6/2014 | Rommer | H04W 36/08 370/331 |
| 2015/0109995 | A1 | 4/2015 | Mathai et al. | |
| 2015/0381493 | A1* | 12/2015 | Bansal | H04L 45/30 370/392 |

OTHER PUBLICATIONS

"LTE Mobile Transport Evolution," Alcatel•Lucent, Strategic White Paper, Copyright © 2011, 16 pages.
(Continued)

*Primary Examiner* — Un C Cho
*Assistant Examiner* — Jeremy M Costin

(57) ABSTRACT

Method for assisting load-balancing of subscriber sessions in a distributed mobile gateway (e.g. PGW, SGW, ePDG, or TWAG) comprising a plurality of distributed gateway instances (DGIs) is disclosed. Method includes receiving an advertisement of GTP fully qualified tunnel endpoints identifications (F-TEIDs) allocated to a first plurality of subscriber sessions, the sessions assigned to a first DGI of the DGIs. The advertisement indicates the first DGI as a recipient for data provided to the gateway and related to any of the first plurality of sessions. Method further includes storing an association between the GTP F-TEIDs of the advertisement and the first DGI, receiving a packet comprising data related to a subscriber session of the first plurality of sessions, identifying a F-TEID for the data of the received packet, identifying from stored association, that the F-TEID is associated with the first DGI, and forwarding data of the packet to the first DGI.

20 Claims, 6 Drawing Sheets

(56) References Cited

OTHER PUBLICATIONS

Hahn, Wolfgang, "3GPP Evolved Packet Core support for distributed mobility anchors," ITST 2011—11th International Conference on Telecommunications for Intelligent Transport Systems, Aug. 23, 2011, St. Petersburg, Russia, 4 pages.
Adeyemi, et al., "A Review of Load Balancing Techniques in 3GPP LTE System," Department of Electrical and Information Engineering, vol. 2 No. 04, Jul. 2013, 5 pages.

\* cited by examiner

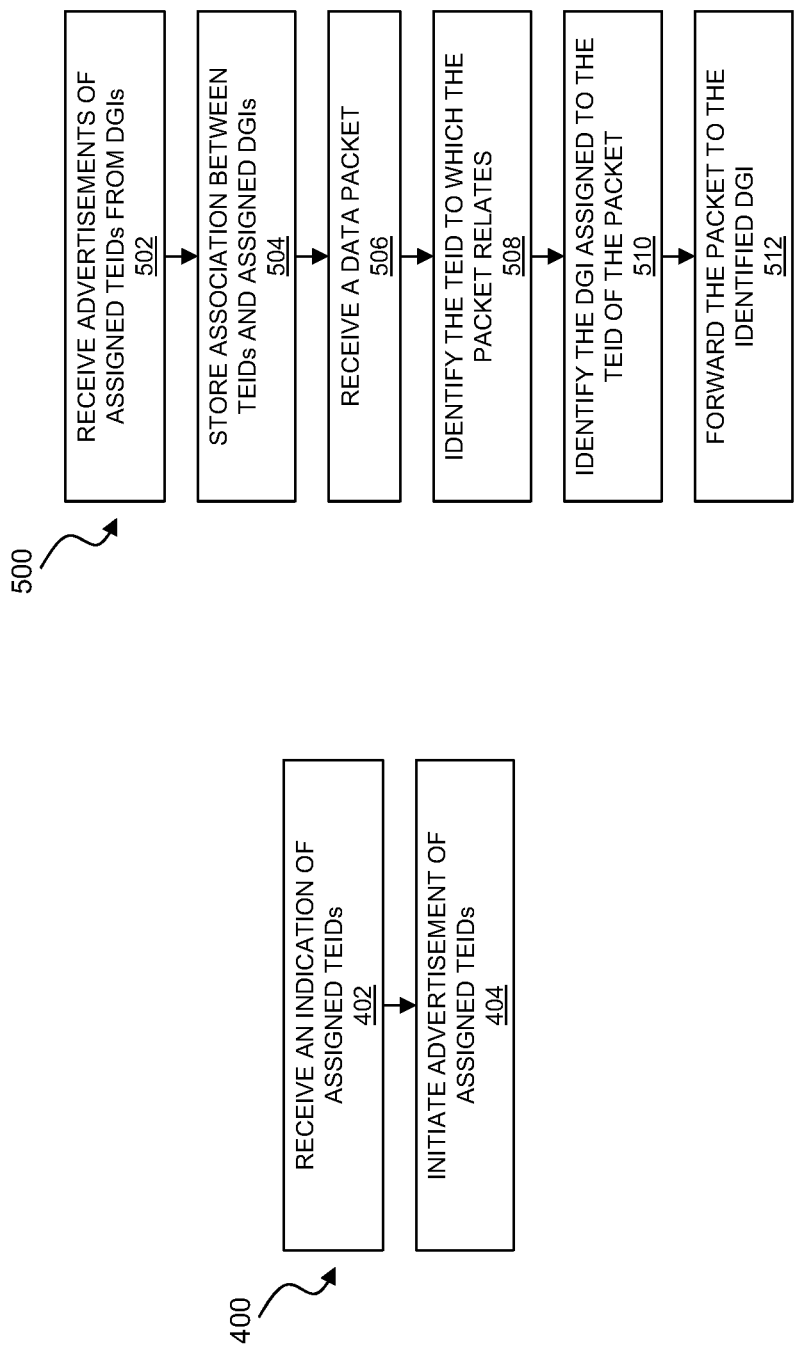

LOAD BALANCING IN A DISTRIBUTED GATEWAY DEPLOYMENT

TECHNICAL FIELD

This disclosure relates in general to the field of communications and, more particularly, to systems and methods for assisting load balancing in a distributed gateway deployment.

BACKGROUND

Wireless networks are telecommunications networks that use radio waves to carry information from one node in the network to one or more receiving nodes in the network. Cellular telephony is characterized by the use of radio cells that provide radio coverage for a regional or geographic area, with multiple cells arranged to provide contiguous radio coverage over a larger regional or geographic area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such devices can connect to a network (e.g., the Internet) as long as the user is within range of such a wireless communication technology. When such a device initially connects to a network, an IP address is assigned to the device. The IP address is later used to carry data.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating example operations associated with assisting load-balancing in a distributed PGW deployment as performed by a DGI logic of each individual DGI, according to some embodiments of the present disclosure;

FIG. 5 is a simplified flow diagram illustrating example operations associated with assisting load-balancing in a distributed PGW deployment as performed by a router logic, according to some embodiments of the present disclosure.

DETAILED DESCRIPTION OF EXAMPLE EMBODIMENTS

Overview

Figure 1A:
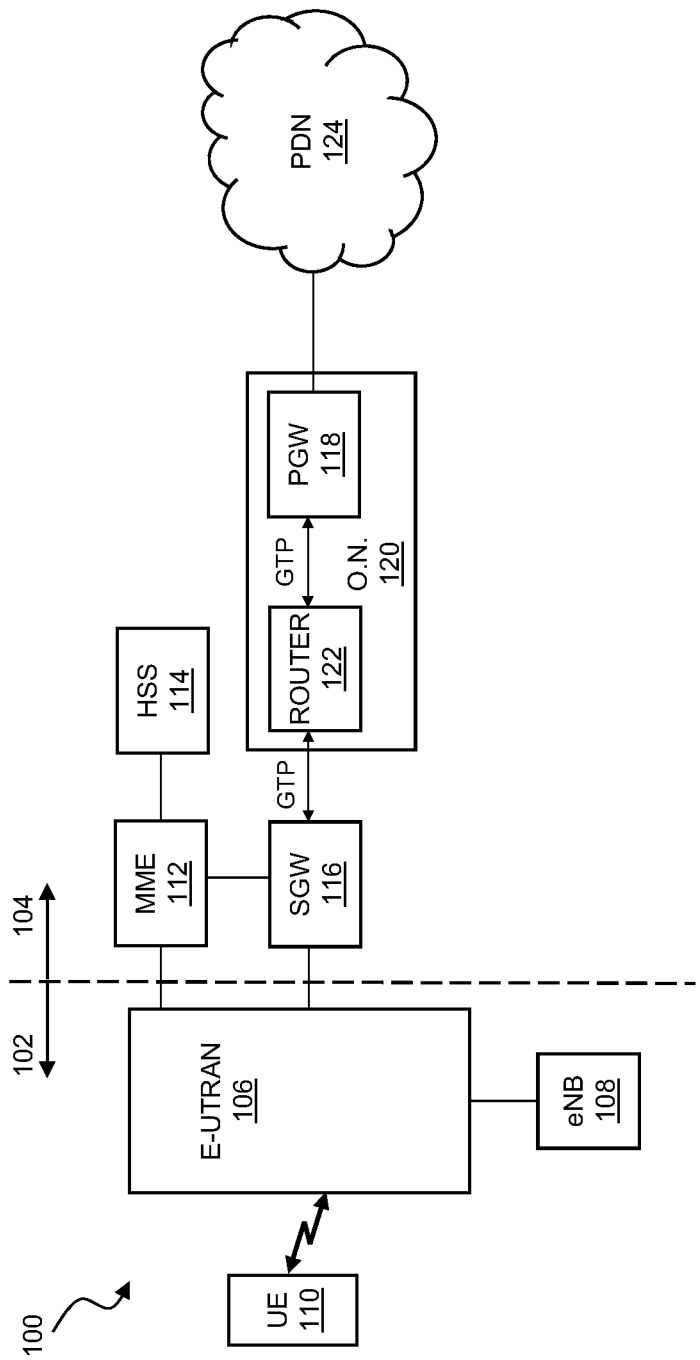
FIG. 1A is a simplified block diagram illustrating an exemplary communication system in a network environment, according to some embodiments of the present disclosure.

Various aspects of the present disclosure provide computer-implemented methods, referred to herein as "distributed gateway methods," for assisting load-balancing of subscriber sessions in a distributed gateway of an LTE network, where a gateway is referred to as "distributed" to reflect the fact that the functionality of the gateway is shared among a plurality of processing sub-systems referred to herein as "distributed gateway instances" (DGIs). In different embodiments, a distributed gateway could be a Packet Data Network (PDN) Gateway (PGW), a Serving Gateway (SGW), an evolved Packet Data Gateway (ePDG), or a Trusted Wireless Access Gateway (TWAG). At least part of the methods could be implemented by a functional entity referred to herein as a "DGI logic" which could be included within each DGI or any network element associated with and/or communicatively coupled to the DGI. Complementary parts of the method could be implemented by a functional entity referred to herein as a "router logic" which could be included within any network element, typically a router, configured to route data traffic between the distributed gateway and another entity, such as e.g. another gateway (e.g. a Serving Gateway (SGW), an evolved Packet Data Gateway (ePDG), or a Trusted Wireless Access Gateway (TWAG)) or a radio access point (e.g. evolved NoveB (eNB)). The load balancing logic could be implemented within such a router or any other network element associated with and/or communicatively coupled to the distributed gateway and the other entity with which this gateway interfaces. In the following, exemplary descriptions are provided in context of the distributed gateway being the PGW and the other entity with which this gateway interfaces being the SGW.

In one aspect of the present disclosure, a distributed gateway method carried out by the DGI logic may include receiving, from a load balancer, an indication of a first plurality of subscriber sessions assigned to a first DGI of the plurality of DGIs, where each subscriber session of the first plurality of subscriber sessions is uniquely identified by a fully qualified tunnel destination endpoint (F-TEID) of a general packet radio service (GPRS) tunnel of GPRS tunneling communications protocol (GTP). The GTP tunnel is between the distributed gateway and another entity of the LTE network. Following discussions are provided for the embodiments where the distributed gateway is a PDN gateway and the further entity is a SGW of the LTE network. However, in other embodiments, possible pairs of distributed gateway and further entity may include SGW and eNB, PGW and ePDG, and PGW and TWAG.

The method carried out by the DGI logic may further include initiating a first advertisement of the F-TEIDs of the first plurality of subscriber sessions, the first advertisement indicating the first DGI as a recipient for data packets provided to the distributed gateway and related to any of the first plurality of subscriber sessions. In present context, as is known, "fully qualified" refers to the fact that the TEID includes the IP address.

In an embodiment of the distributed gateway method carried out by the DGI logic, the method may further include receiving, from the load balancer, an indication of a second plurality of subscriber sessions assigned to the first DGI, where each subscriber session of the second plurality of subscriber sessions is uniquely identified by a F-TEID of the GPRS tunnel between the PDN gateway and the SGW of the LTE network of the GTP; and initiating a second advertisement of the F-TEIDs of the second plurality of subscriber sessions, the second advertisement indicating the first DGI as a recipient for data packets provided to the PDN gateway and related to any of the second plurality of subscriber sessions.

In another aspect of the present disclosure, a distributed gateway method carried out by the router logic may include receiving a first advertisement of F-TEIDs allocated to a first plurality of subscriber sessions, the first plurality of subscriber sessions assigned to a first DGI of the plurality of DGIs, the first advertisement indicating the first DGI as a recipient for data provided to the distributed gateway, e.g. distributed PGW, and related to any of the first plurality of subscriber sessions; storing, in a storage repository, an association between the F-TEIDs of the first advertisement and the first DGI; receiving a packet comprising data related to a subscriber session of the first plurality of subscriber sessions; identifying, from the received packet, a GTP F-TEID assigned to the subscriber session to which the data in the packet relates; identifying, from the stored association, that the identified F-TEID is associated with the first DGI; and forwarding the data of the received packet to the first DGI.

In an embodiment of the distributed gateway method carried out by the router logic, the method may further include performing load-balancing to distribute subscriber sessions between two or more DGIs, i.e. performing load-balancing for mobile data traffic communicated between the distributed gateway and the other entity, e.g. distributed PGW and SGW. In various embodiments, load-balancing could include applying equal-cost multiple-path (ECMP) or/and GTP F-TEID based load balancing.

In various embodiments of the distributed gateway method, the first advertisement may be in a form of one or more Border Gateway Protocol (BGP) update messages comprising network layer reachability information (NLRI) for the F-TEIDs assigned to the first plurality of subscriber sessions. Initiating the first advertisement could then include triggering an edge router to send such update message(s).

In one further embodiment, the first advertisement indicating the first DGI as the recipient for the data related to any of the first plurality of subscriber sessions may include the first advertisement encoding an identification of the first DGI in a NEXT_HOP path attribute field of the one or more BGP update messages. The identification of the first DGI could e.g. include an IP address of the first DGI that is unique in that each DGI of the plurality of DGIs has a different IP address.

In yet another aspect of the present disclosure, in context of Mobile IP (MIP) or Proxy MIP (PMIP) protocols, a distributed gateway method carried out by the DGI logic associated with a distributed gateway (DG) of an LTE network, e.g. a distributed PDN gateway, may include receiving, from a load balancer, an indication of a first plurality of subscriber sessions assigned to a first DGI of the plurality of DGIs, wherein each subscriber session of the first plurality of subscriber sessions is uniquely identified by a Proxy Binding Update comprising a Downlink and Uplink GRE Key Assignment between a Local Mobility Anchor (LMA) of the DG and a trusted non-3GPP IP access gateway of the LTE network over Proxy Mobile IPv6; and initiating a first advertisement of the Proxy Binding Update with the DGI IP address of the first plurality of subscriber sessions, the first advertisement indicating the first DGI as a recipient for data provided to the LMA of the DG and related to any of the first plurality of subscriber sessions.

In an embodiment, initiating the first advertisement may include initiating sending one or more BGP update messages comprising NLRI for the first plurality of subscriber sessions. In one further embodiment, indicating the first DGI as the recipient for the data related to any of the first plurality of subscriber sessions may include ensuring that the one or more BGP update messages encode an identification of the first DGI in a NEXT_HOP path attribute.

In some embodiments, the MIP/PMIP method may further include receiving, from the load balancer, an indication of a second plurality of subscriber sessions assigned to the first DGI, wherein each subscriber session of the second plurality of subscriber sessions is uniquely identified by a Mobile Access Gateway (MAG), LMA and Downlink and Uplink GRE Key of the Mobile IP and Proxy Mobile IPv6 tunnel between the PDN gateway and the HSGW or trusted non-3GPP IP access gateway of the LTE network of the mobile IP or proxy mobile IP; and initiating a second advertisement of the LMA IP address and Downlink and Uplink GRE Key of the second plurality of subscriber sessions, the second advertisement indicating the first DGI as a recipient for data provided to the PDN gateway and related to any of the second plurality of subscriber sessions.

In another aspect of the present disclosure related to MIP/PMIP, a distributed gateway method carried out by the router logic may include receiving a first advertisement of an IP address of an LMA of the DG and Downlink and Uplink GRE Key(s) assigned to a first plurality of subscriber sessions, the first plurality of subscriber sessions assigned to a first DGI of the plurality of DGIs, the first advertisement indicating the first DGI as a recipient for data provided to the DG and related to any of the first plurality of subscriber sessions. The method may further include storing an association between the LMA IP address and Downlink and Uplink GRE Key(s) of the first advertisement and the first DGI, receiving a packet comprising data related to a subscriber session of the first plurality of subscriber sessions, identifying from the received packet a LMA IP address and Downlink and Uplink GRE Key(s) assigned to the subscriber session to which the data in the packet relates, identifying, from the stored association, that the identified LMA IP address and Downlink and Uplink GRE Key(s) are associated with the first DGI, and forwarding the data of the received packet to the first DGI.

In an embodiment, the first advertisement may include one or more BGP update messages comprising NLRI for the first plurality of subscriber sessions. In one further embodiment, the first advertisement indicating the first DGI as the recipient for the data related to any of the first plurality of subscriber sessions may include the first advertisement encoding an identification of the first DGI in a NEXT_HOP path attribute of the one or more BGP update messages.

In an embodiment, the identification of the first DGI may include an IP address of the first DGI.

In an embodiment, the MIP/PMIP method performed by the router logic may further include performing load-balancing to distribute subscriber sessions between two or more DGIs.

In other aspects, one or more non-transitory tangible media encoding logic that include instructions for execution that, when executed by a processor, are operable to perform various operations according to any one of the methods described herein or/and performed by any one of the systems described herein are disclosed.

As will be appreciated by one of ordinary skill in the art, aspects of the present disclosure, in particular the functionality related to assisting load-balancing in a distributed gateway deployment described herein, may be embodied as a system, a method or a computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing PGWs, routers, and various control nodes) or be stored upon manufacturing of these devices and systems.

Example Embodiments

Exemplary Network Environment

For purposes of illustrating the techniques for assisting load-balancing of subscriber sessions in a distributed PGW deployment, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

Figure 1B:
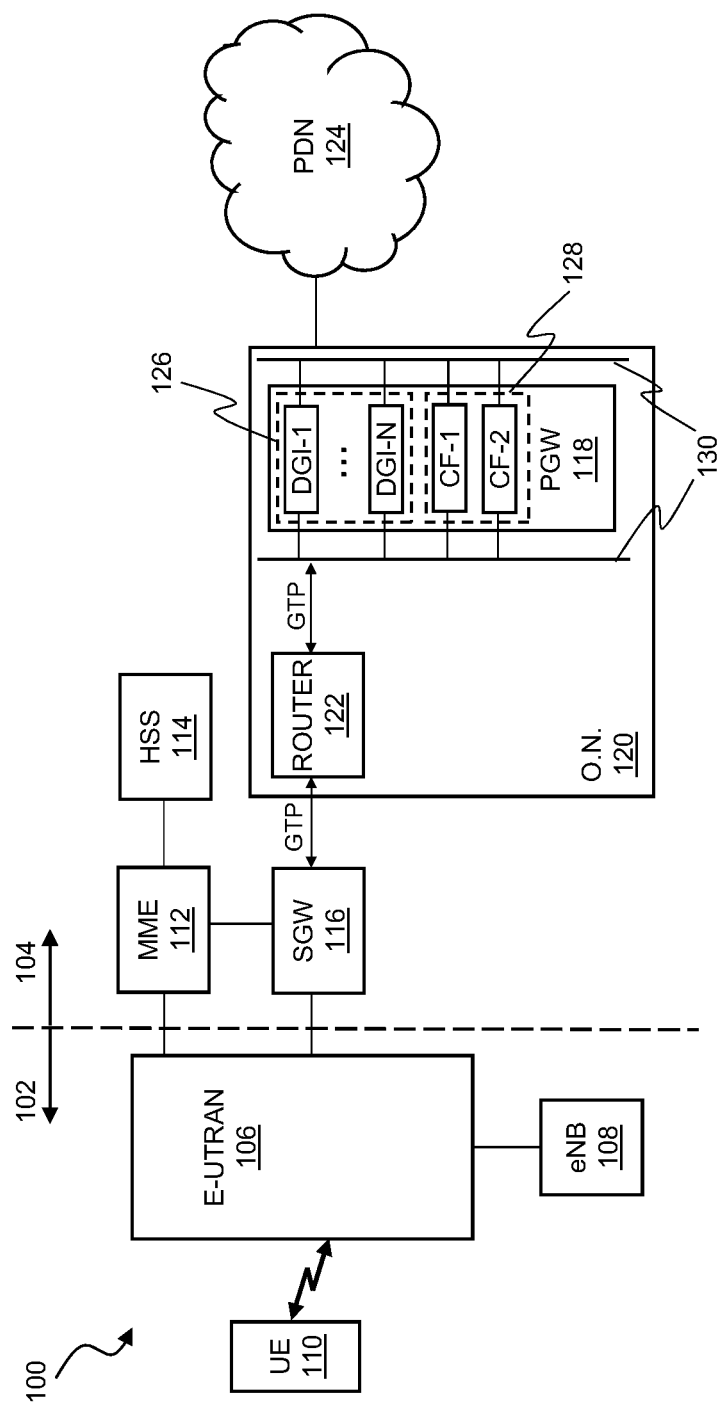
FIG. 1B is a simplified block diagram illustrating an exemplary communication system in a network environment implementing a distributed packet data network (PDN) gateway, according to some embodiments of the present disclosure.

An exemplary network in which embodiments of the present disclosure can be implemented is illustrated in FIGS. 1A-1B, providing simplified block diagrams illustrating a communication system 100 in a network environment according to one embodiment of the present disclosure. An exemplary configuration shown in FIGS. 1A-1B may be tied to the 3rd Generation Partnership Project (3GPP) Evolved Packet System (EPS) architecture, also sometimes referred to as the Long Term Evolution (LTE) EPS architecture. However, while FIGS. 1A-1B illustrate elements of LTE and the embodiments of the present disclosure are described with reference to LTE, various embodiments of the present disclosure and the depicted architectures are equally applicable, with modifications as would be apparent to a person of ordinary skill in the art to other telecommunications environments. Thus, in some instances, communication system 100 may include LTE access networks such as evolved UTRAN, generally referred to as 4G or LTE. In other instances, the communication system 100 may include other access networks such as GSM EDGE radio access network (GERAN), UMTS terrestrial radio access network (UTRAN), generally referred to as 3G, which can be provided using one or more NodeB/Radio Network Controllers (NodeB/RNCs), Home Node B's (HNBs), HNB gateways, Mobile Switching Centers (MSCs), serving General Packet Radio Service (GPRS) support nodes (SGSNs), and gateway GPRS support nodes (GGSNs). In yet other instances, communication system 100 may include non-3GPP networks, such as e.g. WiMAX.

Turning, first, to FIG. 1A, which provides a simpler version of the system 100 shown in FIG. 1B, in general, the communications system 100 may be viewed as comprising a radio access network (RAN) part 102 and a core network (CN) part 104, each part containing various network elements or nodes as described in greater detail below.

In LTE, the radio access network 102 includes an Evolved UMTS Terrestrial Radio Access Network (E-UTRAN) 106 and one or more evolved Node B (eNodeB) transceivers 108, and is used to provide wireless access for devices shown as User Equipment (UE) 110.

Sometimes the terms "LTE" and "E-UTRAN" are used interchangeably.

The eNB 108 is an LTE network radio network component configured to act as a radio access point for the UEs 110 by connecting to the E-UTRAN 106 and being responsible for radio transmission and reception from UEs 110 in one or more cells. Typically, the radio access network 102 includes a plurality of eNB transceivers such as the eNB 108. Furthermore, typically, the radio access network 102 includes further transceivers, not shown in FIG. 1, such as e.g. a 1×RTT transceiver, a high-rate packet data (HRPD) transceiver, and an evolved high-rate packet data (eHRPD) transceiver, each of which can connect to the radio access network 102. Other radio access technologies such as WiFi, Femto, WiMAX, or any other radio spectrum technology can use a further transceiver, not shown in FIG. 1, to connect to the network using a broadband or other access network.

In some embodiments, the eNB 108 may be a Home eNodeB (HeNB) radio access point, also referred to interchangeably as a 'HeNB access point', 'HeNB', 'small cell radio access point', 'small cell access point', 'small cell', 'femtocell' or 'femto'. An HeNB is typically configured to perform the same function of an eNB, but is optimized for deployment for smaller coverage than a typical, macro, eNB, such as e.g. indoor premises and public hotspots.

The eNB 108 represents, in general, any radio access points that can offer suitable connectivity to one or more UEs 110 using any appropriate protocol or technique. Thus, in general terms, eNB 108 represents a radio access point device that can allow UEs to connect to a wired network using Wi-Fi, Bluetooth™, WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 110. In certain cases, the access point can connect to a router (via a wired network), which can relay data between different UEs of the network.

In various embodiments, UEs such as the UE 110 can be associated with users, employees, clients, customers, etc. wishing to initiate a flow in the communication system 100 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within the communication system 100. UE 110 may also be inclusive of a suitable interface to a human user such as a microphone, a display, a keyboard, or other terminal equipment.

UE 110 may also be any device that seeks to initiate a communication on behalf of another entity or element such as a program, a database, or any other component, device, element, or object capable of initiating an exchange within the communication system 100. The term "data" as used herein refers to any type of numeric, voice, video, media, or script data, or any type of source or object code, or any other suitable information in any appropriate format that may be communicated from one point to another. In certain embodiments, UE 110 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses for the access sessions can be assigned using dynamic host configuration protocol (DHCP), Stateless Address Auto-configuration, default bearer activation, etc., or any suitable variation thereof.

For a 3GPP EPS architecture (i.e. in LTE), the core network 104 is sometimes referred to as an Evolved Packet Core (EPC) and typically includes one or more mobility management entities (MMEs) 112, one or more home subscriber servers (HSSs) 114, one or more serving gateways (SGWs) 116, and one or more packet data network (PDN) gateways (PGWs) 118. In some embodiments, one or more of EPC components can be implemented on the same gateway or chassis as described below. The EPC elements may be provided in the service provider network to provide various UE services and/or functions, to implement Quality of Service (QoS) on packet flows and to provide connectivity for UEs to external packet data networks such as e.g. Internet, an exemplary PDN shown in FIG. 1 as a PDN 124.

The MME resides in the EPC control plane and manages node selection, session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN) (not shown in FIG. 1). The MME can also be integrated with 2G/3G elements, such as the SGSN and GGSN. This integration is the key to mobility and session management interworking between 2G/3G and 4G mobile networks.

The MME 112 is a control-node for the LTE access network. The MME may be responsible for UE tracking and paging procedures including retransmissions. The MME 112 may handle the bearer activation/deactivation process and may also be responsible for node selection of an SGW and PGW for a UE at the initial attach and at time of an intra-LTE handover. The MME may also authenticate the user by interacting with the HSS 114. In various embodiments, the MME 112 may also generate and allocate temporary identities to UEs, terminate Non-Access Stratum (NAS) signaling, check the authorization of the UE to camp on the service provider's Public Land Mobile Network (PLMN), and enforce UE roaming restrictions. The MME 112 may also be the termination point in the network for ciphering/integrity protection for NAS signaling and may be configured to handle the security key management. Lawful interception of signaling may also be supported by the MME. Still further, the MME 112 may also provide the control plane function for mobility between LTE and 2G/3G access networks with the S3 interface terminating at the MME from the SGSN (not shown). The MME 112 also terminates the S6a interface towards the home HSS for roaming UEs.

The HSS 114 may store subscription-related information (subscriber profiles), perform authentication and authorization of the user, provide information about the subscriber's location and IP information, and respond to subscription requests from the MME 112. The HSS 114 can provide subscription data using Update-Location Answer (ULA) responses by accessing its user database and providing the user information to the MME 114. The HSS is sometimes referred to as an authentication, authorization, and accounting (AAA) server because it can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. Further, the HSS 114 can be a master user database that supports IP multimedia subsystem (IMS) network entities that handle calls.

The SGW 116 is a data plane element, also referred to as a "user plane element," that can manage user mobility and interfaces with RANs. Being in the user plane, the SGW maintains data paths between eNBs 108 and the PGW 118 by forwarding and routing packets to and from the eNBs and the PGW. The SGW also serves as the local mobility anchor for inter-eNB handover and mobility between 3GPP networks. The SGW is configured to route and forward user data packets, while also acting as the mobility anchor for the user plane during inter-eNB handovers and as the anchor for mobility between LTE and other 3GPP technologies, terminating S4 interface and relaying the traffic between 2G/3G systems and the PGW. For idle state UEs, the SGW terminates the down link data path and triggers paging when down link data arrives for the UE. The SGW can manage and store UE contexts, e.g. parameters of the IP bearer service and network internal routing information, as well as perform replication of the user traffic in case of lawful interception.

In some embodiments, the SGW 116 may be implemented within an access gateway, not shown in FIG. 1 individually, that could implement a combination of additional functionalities such as a packet data serving node (PDSN) and/or a HRPD serving gateway (HSGW). Such an access gateway can communicate with an anchor gateway, not shown individually, which can implement a PGW, a Home Agent (HA), and an MME. On the radio access network side 102, such an anchor gateway can also communicate with an evolved packet data gateway (ePDG), not shown in FIG. 1, which may provide connectivity to the WiFi/Femto/other transceivers besides the eNB 108. On the packet core side 104, such an anchor gateway can communicate with the operator's IP service domain (not shown), an IP multimedia subsystem (IMS) (not shown), and the PDN 124. The AAA/HSS 114 may then communicate with such an access gateway, an anchor gateway, or both.

The PGW 118 provides connectivity for UEs to external packet data networks, shown in FIG. 1 as the PDN 124, which could e.g. be Internet, SIP-based IMS networks (fixed and mobile), or other similar networks. Thus, the PGW 118 acts as the interface between the LTE network and other packet data networks. The PGW serves as the anchor point for intra-3GPP network mobility, as well as mobility between 3GPP and non-3GPP networks. In some embodiments, the PGW 118 may act as the Policy and Charging Enforcement Function (PCEF), which manages Quality of Service (QoS), online/offline flow-based charging data generation, deep-packet inspection, and lawful intercept. The PGW 118 provides connectivity to the UE 110 to external packet data networks by being the point of exit and entry of traffic for the UE. A UE may have simultaneous connectivity with more than one PGW for accessing multiple packet data networks, such multiple PGWs and multiple PDNs not shown in FIG. 1. The PGW 118 may be configured to perform policy enforcement, packet filtering for each user, charging support, lawful interception, and packet screening. The PGW can also provide an anchor for mobility between 3GPP and non-3GPP technologies such as WiMAX and 3GPP2 standards (CDMA 1× and EVDO).

Typically in mobility environments, when a UE connects to a network, an IP address is assigned to the device, which IP address is later used to carry data for the UE. In particular, in LTE deployment of access sessions, i.e. sessions where a subscriber wants to use a service and exchange data with an external PDN, call control signaling is used to assign one of the IP addresses, of a pool of IP addresses of a customer (typically a network operator), to a subscriber (i.e. to a particular UE 110), which IP address is eventually used to carry data between the UE 110 of the subscriber and the PDN 124. Typically, the PGW 118 is in charge of assigning IP addresses for the access sessions.

Mobile packets for the UEs are exchanged between the SGW 116 and the PGW 118 via a tunnel established between the SGW 116 and the PGW 118 according to a GPRS Tunneling Protocol (GTP). Such a tunnel is commonly referred to as a "GTP tunnel." GTP-C is a part of the GTP that is used within the core network 104 for signaling, i.e. exchange of control information, while GTP-U is a part of the GTP that is used for carrying user data within the core network 104 and between the RAN 102 and the core network 104.

In GTP, each subscriber session is uniquely identified by a tunnel endpoint identifier (F-TEID) carried in the header of a packet exchanged between the SGW 116 and the PGW 118. The F-TEID identifies a set of endpoints for a GTP tunnel. Conventional details of using GTP and F-TEIDs are known to persons or ordinary skill in the art and, therefore, are not described herein.

Typically, a network element such as e.g. a router is implemented between the SGW 116 and the PGW 118 in order to route the packets between the SGW 116 and the PGW 118. Such a network element is shown in FIG. 1A as a router 122. FIG. 1A also illustrates a GTP connection between the SGW 116 and the router 122 as well as between the PGW 118 and the router 122. The router 122 and the PGW 118 may be considered to belong to operator's network, shown as O.N. 120 in FIG. 1A.

Since there is a GTP tunnel between the SGW 116 and the PGW 118, each mobile data packet traversing this tunnel in a particular direction has the same source and destination IP addresses. For example, mobile data packets travelling via the GTP tunnel from the SGW 116 to the PGW 118 are characterized by having the IP address of the SGW 116 as their "source IP address" and by having the IP address of the PGW 118 as their "destination IP address." Similarly, mobile data packets travelling via the GTP tunnel from the PGW 118 to the SGW 116 are characterized by having the IP address of the PGW 118 as their "source IP address" and by having the IP address of the SGW 116 as their "destination IP address."

It should be understood that, in various embodiments, any number of eNBs, GWs, PDNs, and other elements shown in FIG. 1 in a singular form may be deployed in the communication system 100. Further, each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, the communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Use of a Distributed Gateway Architecture

Mobile data networks continue to experience an unprecedented explosion in total traffic, number of subscribers, particularly in Internet of Things (IoT) deployments, where millions of devices are connected to the Internet. Mobile network operators are required to scale their gateway devices such as the SGW 116 and the PGW 118 to handle this scale. One approach to scaling is to buy more hardware boxes. However, more recently, instead of buying more hardware boxes, network operators have been investigating implementing virtual gateway solutions such as virtual EPC (vEPC), in order to build processing power gradually and dynamically, better adapting to market transitions.

Virtual EPC is a distributed gateway solution, where a gateway is deployed as set of processing sub-systems, where each sub-system functions as a gateway responsible for processing a sub-set of subscriber sessions. Total load may be shared across these sub-systems in order to meet gateway level scale requirements in terms of e.g. number of subscribers and/or data throughput. Both the PGW 118 and the SGW 116 may be implemented in such a distributed architecture.

FIG. 1B illustrates the communication system 100 as shown in FIG. 1A, where the PGW 118 is implemented as a distributed gateway. To that end, the distributed gateway 118 includes a set of two or more distributed gateway instances (DGIs) 126, shown in FIG. 1B as DGI-1 through DGI-N, where N is an integer greater than one. Each of the DGIs 126 is a network element implemented as a virtual machine (VM) configured to act as a processing sub-system responsible for performing PGW processing related to a sub-set of subscriber sessions identified by their corresponding F-TEIDs. A particular number of DGIs used may depend e.g. on a network operator, where the more subscribers an operator has, the more DGIs would be deployed, and/or the capabilities of the DGIs used, e.g. in terms of their memory, bandwidth, and processing power. Each F-TEID represents a specific subscriber session. Each DGI operating on a sub-set of subscriber sessions means that each DGI operates on a sub-set of F-TEIDs. For example, a F-TEID range of 1-10000 could be assigned to the DGI-1, while a F-TEID range of 10001-100000 could be assigned to DGI-2.

The distributed PGW 118 would typically also include one or more control functions (CFs) 128, shown in FIG. 1B as CF-1 and CF-2, configured to control or manage the distributed PGW 118.

Even though functionality of the PGW 118 is distributed among a set of DGIs 126, to outside network elements such as e.g. the SGW 116 or the MME 112, the PGW 118 appears as a single entity associated with a single IP address, the IP address of the PGW 118, as indicated in FIG. 1B with an internal network boundary 130. Within the internal network 130, each DGI 126 as well as the CF 128 also has an individual IP address used for connectivity to the router 122, but those addresses are not visible to the outside network elements such as the SGW 116 or the MME 112.

In order to take the maximum advantages from the distributed gateway functionality, the router 122 typically includes a load-balancer configured to perform load-balancing between the various DGIs 126. In various embodiments, the load-balancer could apply equal-cost multiple-path (ECMP) or/and any GTP F-TEID based load balancing.

Since, as previously described herein, there is a GTP tunnel between the SGW 116 and the PGW 118, each mobile data packet traversing this tunnel in a particular direction has the same source and destination IP addresses where the IP addresses of the SGW 166 and PGW 118 are used, irrespective of which DGI is supposed to process the packet. Therefore, as a result of performing load-balancing, the router 122 could send each data packet to any of the DGIs because the destination address in all of the packets is the IP address of the PGW 118. Because each DGI is configured to only handle a sub-set of F-TEIDs, if a DGI receives from the router 122 a packet with a F-TEID that is not assigned to it, it resends the packet to one or more other DGIs until the DGI that can handle the packet is found. This kind of resending of packets within the internal network 130 significantly impacts the overall performance. Therefore, improvements with respect to assisting load-balancing in a distributed gateway deployment are desired.

Proposed Assisting in Load-Balancing in a Distributed Gateway Deployment

Embodiments of the present disclosure are based on recognition that it would be desirable to be able to reduce resending of packets between the different DGIs 126 that received from the router 122 packets for F-TEIDs they are not configured to process. To that end, in one aspect, a communication system is provided for assisting load-balancing in a distributed gateway deployment. An example of such a communication system according to some embodiments of the present disclosure is illustrated in FIG. 2 as a communication system 200.

In accordance with one embodiment, the communication system 200 can overcome the aforementioned challenges (and others) by implementing improved distributed gateway methods based on informing the router about which DGI is assigned to process which subscriber sessions. To that end, each DGI is configured to advertise to the router a F-TEID range assigned to the DGI, identifying itself as a NEXT_HOP for the set of subscribers the DGI is configured to process. Correspondingly, the router is configured to examine a GTP packet to be forwarded to the gateway, identify the F-TEID of the packet, and then forward the packet to the correct DGI, i.e. the DGI that is configured to process that F-TEID, based on the received advertisements. In this manner, each DGI will only get packet traffic which the DGI is responsible to service, reducing the overhead and the traffic on the internal network. Consequently, overall performance of a distributed gateway may be significantly improved.

Figure 2:
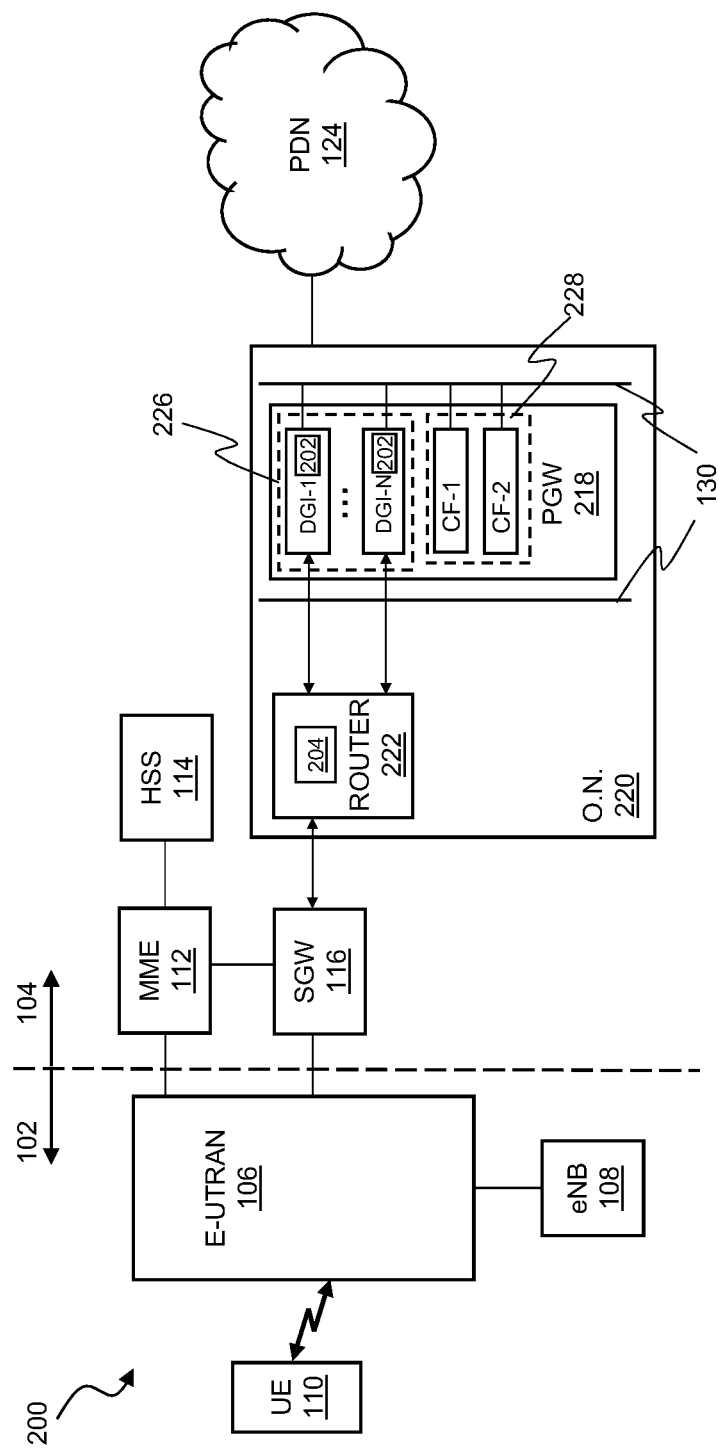
FIG. 2 illustrates a communication system for assisting load-balancing of subscriber sessions in a distributed PDN gateway of a long-term evolution (LTE) network, according to some embodiments of the present disclosure.

FIG. 2 illustrates a communication system 200 for assisting load-balancing of subscriber sessions in a PGW of an LTE network, according to some embodiments of the present disclosure. The communication system 200 includes all of the elements shown in FIG. 1B, which descriptions are applicable here and, therefore, in the interest of brevity, are not repeated. The PGW 218 is similar to the PGW 118 shown in FIG. 1B, except that, in the embodiment shown in FIG. 2, DGIs 226 of the PGW 218 further include DGI logic 202 configured to carry out parts of the improved distributed gateway methods described herein. The one or more CFs 228 may be modified accordingly to control or manage the DGIs 226. Furthermore, the router 222 shown in FIG. 2 is similar to the router 122 of FIG. 1B, except that it further includes router logic 204 configured to carry out parts of the improved distributed gateway methods described herein. Together, the DGI logic 202 and the router logic 204 ensure that the router is informed of the F-TEIDs assigned to the individual DGIs 226 and forwards packets accordingly.

It should be noted that, while the descriptions are provided with respect to distributed functionality of a PGW, analogous descriptions are applicable to distributed functionality of a SGW or combined SGW 116 and PGW 118 functionality, referred as SAE gateway in 3GPP standard, which are, therefore, within the scope of the present disclosure.

It should be noted that various repositories may be associated with the logic 202 and 204, not shown in FIG. 2. Furthermore, even though the logic 202 and 204 are illustrated in FIG. 2 as included within the DGIs and the router, respectively, in other embodiments, separate network elements or a plurality of network elements may implement functionality of each of the logic 202 and 204.

In one example implementation, logic 202, logic 204, PGW 218, DGIs 226, MME 112, SGW 116, HSS 114, router 222 and other elements shown in FIG. 2 are network elements, which are meant to encompass network appliances, servers, routers, switches, gateways, bridges, load balancers, firewalls, processors, modules, or any other suitable device, component, element, or object operable to exchange information that facilitates or otherwise helps to provide assisted load-balancing in a distributed gateway deployment described herein. In other embodiments, these operations and/or features may be provided external to these elements, or included in some other network device/element or a plurality of elements to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

Figure 3:
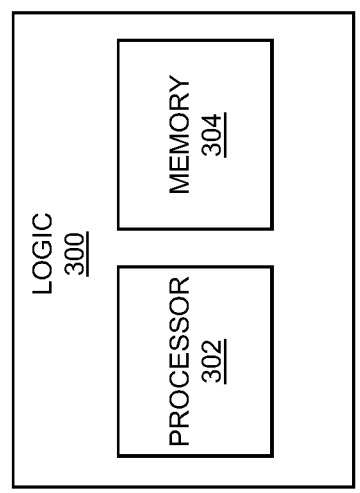
FIG. 3 illustrates a logical entity for assisting load-balancing of subscriber sessions in a distributed PDN gateway, according to some embodiments of the present disclosure.

FIG. 3 illustrates a logical entity 300 for assisting load-balancing in a distributed gateway, according to some embodiments of the present disclosure. In various embodiments, either one or each of logic 202 and 204 may be implemented as the logical entity 300. FIG. 3 may be considered to illustrate exemplary internal structure associated with logic 202 and 204, as well as with any other elements shown in FIG. 2.

As shown in FIG. 3, the logic 300 may include at least one processor 302 and at least one memory element 304, along with any other suitable hardware and/or software to enable its intended functionality of assisting load-balancing in a distributed gateway as described herein. Similarly, each of the eNB 108, the UE 110, the MME 112, the HSS 114, and the SGW 116 may include memory elements for storing information to be used in achieving the improved distributed gateway operations as outlined herein, and a processor that can execute software or an algorithm to perform activities related to the load-balancing in a distributed gateway as discussed in this Specification. Any of these devices may further keep information in any suitable memory element

[e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the logic 202 and 204, the eNB 108, the UE 110, the MME 112, the HSS 114, the SGW 116, the PGW 218, and the router 222 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and UE (e.g., mobile nodes) can also include suitable interfaces for receiving, transmitting, and/or otherwise communicating data or information in a network environment.

Note that in certain example implementations, the improved load-balanced distributed gateway mechanisms as outlined herein may be implemented by logic encoded in one or more tangible media, which may be inclusive of non-transitory media, e.g., embedded logic provided in an ASIC, in DSP instructions, software [potentially inclusive of object code and source code] to be executed by a processor, or other similar machine, etc. In some of these instances, memory elements, such as e.g. memory 304 shown in FIG. 3, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 302 shown in FIG. 3, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

FIG. 4 is a simplified flow diagram 400 illustrating example operations associated with assisting load-balancing in a distributed PGW deployment as performed by a DGI logic of each individual DGI such as e.g. the DGI logic 202, according to some embodiments of the present disclosure. For simplicity, actions of the flow diagram 400, as well as of the flow diagram 500 shown in FIGS. 4 and 5, are described to be performed, respectively, by the DGI and the router, even though it is the respective logics 202 and 204 within or associated with those elements that are configured to perform the actions.

For the context, each sub-system 226 has an IP address assigned to it for connectivity purposes within the operator network 220, referred to herein as a "local IP address" of a DGI. Subscriber sessions are created using call transaction using GTP. Initially, GTP F-TEID for GTP-C may be set to zero. A load-balancer which could e.g. be included within the router 222, but does not have to be included in the router 222, will choose specific DGI to offload a subscriber session, but typically a plurality of subscriber sessions, based on the load. As used herein, "offloading a subscriber session to a DGI" refers to assigning a particular DGI to process that subscriber session. Once a session is allocated to a specific DGI, the DGI allocates a F-TEID to that session, which F-TEID remains unique within distributed gateway. That specific DGI also allocates resources to that session, such as e.g. bearer/service IP address, etc. The load-balance DGI with distributed gateway, sometimes also referred as DEMUX, would assign set of F-TEIDs to be served by an individual DGIs.

In this context, the method 400 may begin as shown with a box 402, where a particular DGI, e.g. DGI-1 shown in FIG. 2, receives an indication of subscriber sessions assigned, or offloaded, to it. As previously described herein, each subscriber session is uniquely identified by its F-TEID used for communicating data packets between the SGW and the PGW over the GTP tunnel. Therefore, box 402 means that the DGI-1 receives a range of F-TEIDs that it is assigned to process, with one F-TEID per each subscriber session.

In an embodiment, the DGI may receive such an indication of subscriber sessions assigned to it as a result of a load-balancer running a load-balancing algorithm that distributes the subscriber sessions between the plurality of DGIs 226, i.e. offloads subscriber sessions as described above.

The method 400 may then proceed with the logic 202 of that DGI initiating an advertisement of the F-TEIDs assigned to it, along with indicating that DGI as the recipient of packets provided to the PGW 218 and related to any of the subscriber sessions identified by the set of F-TEIDs assigned to that DGI (box 404 in FIG. 4). Thus, each DGI 226 is configured to initiate advertisement that carries association between the GTP F-TEID range assigned to the DGI and the DGI itself, the DGI indicated e.g. by its local IP address within the operator network 220.

It should be noted that, typically, routers are capable of performing packet inspection on a GTP header and that is why description provided herein refers to using IP addresses to identify DGIs in order to route the traffic. However, in other embodiments, a router or a switch may have a built-in capability of doing GTP lookup, in which case MAC addresses could be used to uniquely identify the DGIs. The switch/router could then perform load balancing based on GTP F-TEID and MAC addresses bonding. Since a person of ordinary skill in the art would readily recognize how to adapt teachings provided herein to implement embodiments where MAC addresses are used, these embodiments are within the scope of present disclosure.

In various embodiments, any kind of advertisement may be used as long as it results in the DGI informing the router 222 of the F-TEIDs assigned to it. In this manner, the DGI can install a load-balancing rule on the router 222 instructing the router 222 to examine the F-TEID of packets to be forwarded to various DGIs and only forward the packets to those respective DGIs that are configured to process the respective F-TEIDs of those packets. In other words, the DGI installs load-balancing on the router 222 by tying one destination, i.e. the local IP address of the DGI, with a range of F-TEIDs assigned to that DGI. Installing load balancing on the router 222 in this manner ensures that hashing at the router may remain simple and compact.

Actions of boxes 402 and 404 may be performed multiple times by each DGI as new subscriber sessions may be offloaded to each DGI. As a new range of F-TEIDs is assigned to a DGI in box 402, the DGI initiates new advertisement for the F-TEIDs of the new range, as described in box 404. In this manner, mechanisms described herein allow performing load balancing of subscriber sessions among DGIs and maintaining elasticity of the configuration by moving subscribers dynamically based on the load.

In an embodiment, advertisement may be initiated and carried out by the DGI communicating with an edge router (not shown in FIG. 2) associated with the DGI and triggering the edge route to send one or more Border Gateway Protocol (BGP) update messages comprising network layer reachability information (NLRI) for the F-TEIDs assigned to the subscriber sessions allocated to that DGI. Such update messages are configured to indicate routes for the assigned F-TEIDs as going via the correct DGI.

A brief background regarding route advertisements is now provided.

A network environment where data is exchanged may be viewed as a collection of Autonomous Systems, where an "Autonomous System" (AS) typically refers to a set of network elements, such as e.g. routers, switches, and controllers, under a single technical administration. Segregation into different AS's allows defining administrative authorities and routing policies of different organizations. Each AS is "autonomous" (i.e., relatively independent from the other AS's) in the sense that is runs its own independent routing policies and unique Interior Gateway Protocols (IGPs). For example, the internal network 130 could be considered to be an AS.

Exterior routing protocols were created, the current standard EGP being the Border Gateway Protocol (BGP), to exchange routing information between different AS's, a process often referred to as "route advertisement." For example, the BGP defines an inter-AS routing protocol, where one of the primary functions is to exchange network reachability information (NLRI) using a so-called "BGP speaking system" (also often referred to as a "BGP speaker") by means of sending so-called "update messages." NLRI may be viewed as a name of a particular field in a BGP update message, the field encoding one or more IP addresses, the IP addresses also referred to in that context as routes, prefixes, IP address prefixes, or destinations.

AS's communicate within and with each other by means of routers. Routers in one AS that are configured to communicate with routers in other AS's are referred to as "edge routers", while routers in one AS that are only configured to communicate with other routes in the same AS are referred to as "core routers."

As mentioned above, a BGP speaker, which is typically, but not necessarily, implemented in an edge router, is used to exchange NLRI with other BGP systems, where the NLRI is exchanged between BGP routers in update messages used to send routing updates to peers. When a BGP session is initialized, update messages are sent until the complete BGP table has been exchanged. Every time an update message is received, the BGP routing table is updated and the BGP route table version is incremented by one. Thus, communicating network elements initially exchange their entire BGP routing table, and then send incremental updates, using update messages.

Besides NLRI, an update message typically also includes path attributes. The NLRI may include one or more routes (i.e. IP address prefixes), as well as multiple path attributes. If a BGP speaker chooses to advertise a route, it may add to or modify the path attributes of the route before advertising it to a peer.

Within an update message, routes are advertised between a pair of BGP speakers with the NLRI comprising a destination field listing, in a form of IP address prefixes, IP addresses of the systems to which the routing information relates. The actual routing information is included in a path attributes field of the same update message by listing path attributes, such as ORIGIN, AS_PATH, NEXT_HOP, etc.

In BGP, path attributes may be categorized into four following categories: 1) well-known, mandatory attributes, 2) well-known discretionary attributes, 3) optional, transitive attributes, and 4) optional, non-transitive attributes. The path attributes of the first category must appear in every update message and must be supported by all BGP implementations. If such an attribute is missing from an update message, a notification message is sent to a peer. Such attributes include e.g. AS_PATH, ORIGIN, and NEXT_HOP.

The path attributes of the second category may or may not appear in an update message but must be supported by all BGP implementations. Such attributes include e.g. LOCAL_PREF and ATOMIC_AGGREGATE.

The path attributes of the third category may or may not be supported by all BGP implementations. If it is sent in an update message but not recognized by the receiver, it should be passed on to the next AS. Such attributes include e.g. AGGREGATOR and COMMUNITY.

The path attributes of the fourth category may or may not be supported by all BGP implementations and, if received, it is not required that the router passes it on. Such attributes include e.g. MULTI_EXIT_DISC, ORIGINATOR_ID, and CLUSTER_LIST.

Turning back to the box 404 of the logic 202 of a particular DGI 226 initiating advertisement of the F-TEIDs assigned to that DGI, such a step would enable a speaker, e.g. within an edge router of the internal network 130 (not shown in FIG. 2), to start advertising routes for the F-TEID range assigned to that DGI and indicating an IP address of that particular DGI in the NEXT_HOP field of path attributes for the advertised F-TEIDs. To peer edge routers, including the router 222, such advertisements would indicate the particular DGI of the NEXT_HOP field of the update message as the next closest network element that a data packet for one of the advertised F-TEIDs should go to.

In other embodiments, the DGIs may employ other types of advertisements, such as e.g. command-line-interface (CLI)/Netconf based APIs or REST APIs provided by router to configure this GTP to next hop bonding.

Figure 6:
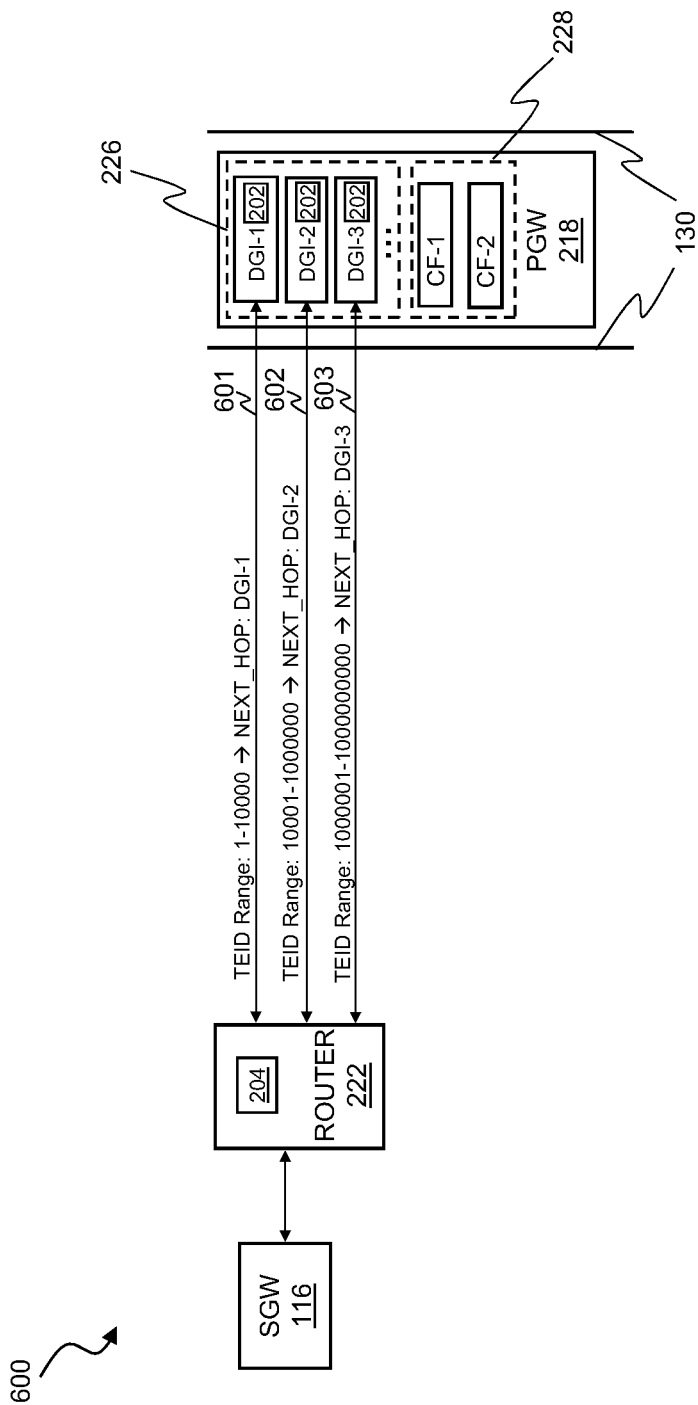
FIG. 6 is a simplified block diagram illustrating an example of different GTP TEID ranges assigned to different DGIs, according to some embodiments of the present disclosure.

FIG. 5 is a simplified flow diagram 500 illustrating example operations associated with assisting load-balancing in a distributed PGW deployment as performed by a router logic such as e.g. the router logic 204, according to some embodiments of the present disclosure. The method may begin with box 502, where the router 222 receives advertisements from the various DGIs 226, each advertisement indicating the range of F-TEIDs assigned to that DGI and indicating a respective DGI as the recipient of data packets for F-TEIDs assigned to it, as described above with reference to FIG. 4. FIG. 6 is a simplified block diagram 600 illustrating an example of different F-TEID ranges assigned to different DGIs, according to some embodiments of the present disclosure. For clarity, the flow diagram 500 may be described with reference to a particular example shown in FIG. 6.

As the router 222 receives the advertisements, it stores in a repository (not shown in FIG. 2), the associations between the ranges of F-TEIDs and the DGIs assigned to them. For the example illustrated in FIG. 6, the router 222 could store that a F-TEID range of 1-10000 has been assigned to the DGI-1 (shown in FIG. 6 with a double-arrow 601), a F-TEID range of 10001-100000 has been assigned to DGI-2 (shown in FIG. 6 with a double-arrow 602), and F-TEID range 1000001-1000000000 has been assigned to DGI-3 (shown in FIG. 6 with a double-arrow 603).

As the router 222 receives a GTP packet indicating IP address of the PGW 218 as the destination IP address of the packet (box 506 in FIG. 5), the router 222 identifies the F-TEID to which the packet relates to, from the header of the packet (box 508 in FIG. 5). The router 222 then accesses the repository storing the associations between the ranges of F-TEIDs and the DGIs assigned to them in order to determine a particular DGI that is supposed to process that F-TEID (box 510 in FIG. 5). For the example shown in FIG. 6, consider that the router received a packet identifying a F-TEID of 1000. The router 222 would then identify that DGI-1 is the DGI assigned to process that F-TEID. The router 222 would then forward the packet to DGI-1 (box 512 in FIG. 5). To that end, the router 222 could be configured to re-write the destination IP address of the packet by replacing the IP address of the PGW 218 with the IP address of the DGI-1. As previously described herein, the router 222 obtained the IP address of the DGI-1 as a result of DGI-1 initiating advertisement as described in box 404 of FIG. 4.

The double arrows 601, 602, and 603 shown in FIG. 6 intend to illustrate the collaboration between the individual DGIs 226 and the router 222. For example, the arrow 601 from the DGI-1 to the router 222 indicates that DGI-1 triggers advertisement that provides the router with the information shown in FIG. 6 above the arrow 601, namely that for the F-TEID range of 1-10000, the IP address of DGI-1 it to be used as a NEXT_HOP because DGI-1 is assigned to process packets with those F-TEIDs. On the other hand, the arrow 601 from the router 222 to the DGI-1 indicates that when the router receives a packet with a F-TEID from the range of 1-10000, the router will forward that packet to DGI-1 as the NEXT_HOP. Analogous reasoning holds for the arrows 602 and 603.

Actions illustrated in FIG. 5 may be performed multiple times as the router 222 receives new advertisements and new packets to be forwarded. Furthermore, actions of boxes 506-512 do not always have to immediately follow the actions of boxes 502-504 because the associations could already be stored as new packets to be forwarded are received. In fact, actions of boxes 502-504 and boxes 506-512 may be viewed as different aspects of the improved router functionality and could be implemented at different times with respect to one another as shown in FIG. 5.

Embodiments described herein may be used for the router 222 sending both user data packets, i.e. GTP-U packets, and signaling data packets, i.e. GTP-packets, to the correct DGI 226 of the PGW 218. In this manner, load balancing of subscribers may be viewed as being overlaid at VEPC level to the external router (i.e. the router 222). Without the improved mechanisms described herein, if a router such as the router 122 is merely doing load balancing based on only GTP F-TEID or IP parameters, it is necessary to have a mechanism to forward packets from one DGI to another as the router can send a packet to any DGI. Such a solution would not scale well because the DGIs are distributed over L2/L3 networks. While in a hardware based platform this may not have been a big issue because typically such processing sub-systems would be connected via very high speed backplane, this is a problem in SDN deployment, the problem that is improved on by the mechanisms described herein.

Above, advertisement of routes is described in context of BGP, where load-balancing among the different DGIs is assisted/improved by ensuring that an identification of a respective DGI assigned to each F-TEID range is encoded in the NEXT_HOP field of one or more BGP update messages for the F-TEIDs of that F-TEID range. A person of ordinary skill in the art will, however, readily recognize that these teachings are equally applicable to other embodiments and to protocols other than eBGP, all of which, therefore, being within the scope of the present disclosure. Further, unless technically not feasible, the BGP and the BGP update messages describe herein may refer, respectively, to BGPSEC and BGPSEC update messages, as well as to Ethernet Virtual Private Network (EVPN) BGP and EVPN BGP update messages. As is known in the art, BGPSEC is a relatively recent extension to the BGP, providing cryptographic assurance to a BGP speaker who receives a valid BGPSEC route advertisement in that the advertised route has the property that every AS on the path of AS's listed in the advertisement has explicitly authorized the advertisement of the route to the subsequent AS in the path. On the other hand, EVPN BGP refers to using BGP as a control protocol in Network Virtualization Overlay (NVO) solutions to distribute tenant system reachability and underlay tunnel endpoint information in context of an L2 Virtual Private Network (L2VPN) solution over IP/MPLS networks.

In addition, for clarity reasons, embodiments described in the present disclosure relate to distributed implementation of a PGW interfacing with a SGW. However, teachings presented herein are equally applicable to distributed implementations of gateways on other GTP interfaces, such as e.g. SGW to evolved NodeB (eNB), PGW to evolved Packet Data Gateway (ePDG), and PWG to Trusted Wireless Access Gateway (TWAG). All of these interfaces use GTP and can use analogous (same or similar) load balancing concepts by selecting the GTP-U IP address based upon load characteristics and signaling to the session requestor the selected IP address for use on the bearer plane.

Furthermore, teachings presented herein are applicable to other tunneling technologies, such as e.g. Layer 2 Tunneling Protocol (L2TP), which uses a similar construct of an outer tunnel IP address with a tunnel identifier in the header that separates user traffic. In L2TP, there are multiple outer tunnel IP addresses whose reachability is advertised by the BGP and a controller would be configured select the applicable IP address for the session and load balance based upon the load on the forwarding entities.

Still further, teachings presented herein are applicable, with modifications that would be apparent to a person of ordinary skill in the art based on the descriptions provided herein, to Mobile IP (MIP) and Proxy MIP (PMIP) protocols. With PMIP in LTE networks, the user (bearer) plane and control plane use the same IP address, however user plane uses Generic Routing Encapsulation (GRE) tunneling protocol, instead of GTP's TEIDs to differentiate flows. For MIP using GRE is optional. Since embodiments described herein are based on indicating the IP address for user plane to load balance the traffic across multiple forwarding entities, then changes to the protocol would be needed to make this solution work. Alternatively, forwarding plane would need to be configured to route based on GRE. In various embodiments, the signaling protocol can be configured to support returning different IP addresses for the user plane.

With reference to the terminology and descriptions of the 3GPP TS 29.402 architecture in LTE and MIP/PMIP basics as known to persons of ordinary skill in the art, descriptions provided above may be adapted to MIP/PMIP by considering that TEIDs described above are analogous to proxy binding update messages that include Downlink and Uplink GRE Key Assignments between a Local Mobility Anchor (LMA) of a PDN gateway and a trusted non-3GPP IP access gateway, e.g. a High-Rate Packet Data (HRPD) serving gateway (HSGW) of the LTE network over PMIP IPv6. Advertisements would then carry, instead of the F-TEID, Proxy Binding updates with the DGI IP address of a plurality of subscriber sessions. In a departure of PMIP IPv6 protocol, such an advertisement would indicate the identified DGI was a recipient for data provided to the LMA of the PDN gateway related to those subscriber sessions.

Thus, in an embodiment, a system for assisting load-balancing of subscriber sessions in a distributed PDN gateway of an LTE network may be configured to receive, from a load balancer, an indication of a first plurality of subscriber sessions assigned to a first DGI of the plurality of DGIs, where each subscriber session of the first plurality of subscriber sessions is uniquely identified by a proxy binding update that includes a Downlink and Uplink GRE Key Assignment between the LMA of a PDN gateway and a trusted non-3GPP IP access gateway (for example HSGW) of the LTE network over Proxy Mobile IPv6; and, in a departure of Proxy mobile IPv6 protocol, initiate a first advertisement of the Proxy Binding Updates with the DGI IP address of the first plurality of subscriber sessions, the first advertisement indicating the first DGI as a recipient for data provided to the LMA of the PDN gateway and related to any of the first plurality of subscriber sessions.

In some further embodiments, initiating such an advertisement may include initiating sending one or more BGP update messages comprising NLRI for the first plurality of subscriber sessions. In an embodiment, indicating the first DGI as the recipient for the data related to any of the first plurality of subscriber sessions could include ensuring that the one or more BGP update messages encode an identification of the first DGI in a NEXT_HOP path attribute. The identification of the first DGI could, again, include an IP address of the first DGI.

In some further embodiments, the system may be further configured to receive, from the load balancer, an indication of a second plurality of subscriber sessions assigned to the first DGI, wherein each subscriber session of the second plurality of subscriber sessions is uniquely identified by a Mobile Access Gateway (MAG), LMA and Downlink and Uplink GRE Key of the MIP and PMIPv6 tunnel between the PDN gateway and the HSGW or trusted non-3GPP IP access gateway of the LTE network of the mobile IP or proxy mobile IP and initiate a second advertisement of the LMA IP address and Downlink and Uplink GRE Key of the second plurality of subscriber sessions, the second advertisement indicating the first DGI as a recipient for data provided to the PDN gateway and related to any of the second plurality of subscriber sessions.

On the other hand, in context of MIP/PMIP, the router logic may be configured to receive a first advertisement of LMA IP address and Downlink and Uplink GRE Key assigned to a first plurality of subscriber sessions, the first plurality of subscriber sessions assigned to a first DGI of the plurality of DGIs, the first advertisement indicating the first DGI as a recipient for data provided to the PDN gateway and related to any of the first plurality of subscriber sessions; store an association between the LMA IP address and Downlink and Uplink GRE Keys of the first advertisement and the first DGI; receive a packet comprising data related to a subscriber session of the first plurality of subscriber sessions; identify, from the received packet, a LMA IP address and Downlink and Uplink GRE Key assigned to the subscriber session to which the data in the packet relates; identify, from the stored association, that the identified LMA IP address and Downlink and Uplink GRE Key is associated with the first DGI; and forward the data of the received packet to the first DGI.

BGP update messages may be used in context of MIP/PMIP in a similar manner as that described in greater detail above.

It is important to note that the steps in the appended diagrams illustrate only some of the possible signaling scenarios and patterns that may be executed by, or within, the communication system 200. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the communication system 200 in that any suitable arrangements, chronologies, configurations, and timing mechanisms may be provided without departing from the teachings provided herein.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to assisting load-balancing in a distributed gateway deployment described herein. This may be inclusive of appropriate algorithms and communication protocols that allow for the effective exchange of data or information.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A system for assisting load-balancing of subscriber sessions in a packet data network (PDN) gateway of a long-term evolution (LTE) network, where the PDN gateway includes a plurality of distributed gateway instances (DGIs), the system comprising:
  at least one memory element configured to store computer executable instructions, and
  at least one processor coupled to the at least one memory element and configured, when executing the instructions, to:
    receive, from a load balancer, an indication of a first subset of a plurality of subscriber sessions assigned to a first DGI of the plurality of DGIs, wherein the first subset of the plurality of subscriber sessions comprises at least two subscriber sessions, and wherein each subscriber session of the first subset of the plurality of subscriber sessions is uniquely identified by a fully qualified tunnel destination endpoint (F-TEID) of a general packet radio service (GPRS) tunnel between the PDN gateway and a serving gateway (SGW) of the LTE network of GPRS tunneling communications protocol (GTP); and
    initiate a first advertisement of the F-TEIDs of the first subset of the plurality of subscriber sessions, the first advertisement indicating the first DGI as a recipient for data provided to the PDN gateway and related to any of the first subset of the plurality of subscriber sessions.

2. The system according to claim 1, wherein initiating the first advertisement comprises initiating sending one or more Border Gateway Protocol (BGP) update messages comprising network layer reachability information (NLRI) for the first subset of the plurality of subscriber sessions.

3. The system according to claim 2, wherein indicating the first DGI as the recipient for the data related to any of the first subset of the plurality of subscriber sessions comprises ensuring that the one or more BGP update messages encode an identification of the first DGI in a NEXT_HOP path attribute.

4. The system according to claim 1, wherein the first subset of the plurality of subscriber sessions comprises a range of F-TEIDs assigned to the first DGI.

5. The system according to claim 1, wherein the at least one processor is further configured to:
  receive, from the load balancer, an indication of a second subset of the plurality of subscriber sessions assigned to the first DGI, wherein the second subset of the plurality of subscriber sessions comprises at least two subscriber sessions, and wherein each subscriber session of the second subset of the plurality of subscriber sessions is uniquely identified by a F-TEID of the GPRS tunnel between the PDN gateway and the SGW of the LTE network of the GTP; and
  initiate a second advertisement of the F-TEIDs of the second subset of the plurality of subscriber sessions, the second advertisement indicating the first DGI as a recipient for data provided to the PDN gateway and related to any of the second subset of the plurality of subscriber sessions.

6. The system according to claim 1, wherein the system is the first DGI.

7. A system for assisting load-balancing of subscriber sessions in a packet data network (PDN) gateway of a long-term evolution (LTE) network, where the PDN gateway includes a plurality of distributed gateway instances (DGIs), the system comprising:
  at least one memory element configured to store computer executable instructions, and
  at least one processor coupled to the at least one memory element and configured, when executing the instructions, to:
    receive a first advertisement of fully qualified tunnel destination endpoints (F-TEIDs) assigned to a first subset of a plurality of subscriber sessions, wherein the first subset of the plurality of subscriber sessions comprises at least two subscriber sessions, the first subset of the plurality of subscriber sessions assigned to a first DGI of the plurality of DGIs, the first advertisement indicating the first DGI as a recipient for data provided to the PDN gateway and related to any of the first subset of the plurality of subscriber sessions;
    store an association between the F-TEIDs of the first advertisement and the first DGI;
    receive a packet comprising data related to a subscriber session of the first subset of the plurality of subscriber sessions;
    identify, from the received packet, a F-TEID assigned to the subscriber session to which the data in the packet relates;
    identify, from the stored association, that the identified F-TEID is associated with the first subset of the plurality of subscriber sessions assigned to the first DGI; and
    forward the data of the received packet to the first DGI associated with the identified F-TEID.

8. The system according to claim 7, wherein the first advertisement comprises one or more Border Gateway Protocol (BGP) update messages comprising network layer reachability information (NLRI) for the first subset of the plurality of subscriber sessions.

9. The system according to claim 8, wherein the first advertisement indicating the first DGI as the recipient for the data related to any of the first subset of the plurality of subscriber sessions comprises the first advertisement encoding an identification of the first DGI in a NEXT_HOP path attribute of the one or more BGP update messages.

10. The system according to claim 7, wherein the first subset of the plurality of subscriber sessions comprises a range of F-TEIDs assigned to the first DGI.

11. The system according to claim 7, wherein the at least one processor is further configured to:
  perform load-balancing to distribute the plurality of subscriber sessions between two or more DGIs.

12. A system for assisting load-balancing of subscriber sessions in a distributed gateway (DG) of a long-term evolution (LTE) network, where the DG includes a plurality of distributed gateway instances (DGIs), the system comprising:
  at least one memory element configured to store computer executable instructions, and
  at least one processor coupled to the at least one memory element and configured, when executing the instructions, to:
    receive, from a load balancer, an indication of a first subset of a plurality of subscriber sessions assigned to a first DGI of the plurality of DGIs, wherein the first subset of the plurality of subscriber sessions comprises at least two subscriber sessions, and wherein each subscriber session of the first subset of the plurality of subscriber sessions is uniquely identified by a Proxy Binding Update comprising a Downlink and Uplink Generic Routing Encapsulation (GRE) Key Assignment between a Local Mobility Anchor (LMA) of the DG and a trusted non-3rd Generation Partnership Project (3GPP) Internet Protocol (IP) access gateway of the LTE network over Proxy Mobile Internet Protocol version 6 (IPv6); and initiate a first advertisement of the Proxy Binding Update with the DGI IP address of the first subset of the plurality of subscriber sessions, the first advertisement indicating the first DGI as a recipient for data provided to the LMA of the DG and related to any of the first subset of the plurality of subscriber sessions.

13. The system according to claim 12, wherein initiating the first advertisement comprises initiating sending one or more Border Gateway Protocol (BGP) update messages comprising network layer reachability information (NLRI) for the first subset of the plurality of subscriber sessions.

14. The system according to claim 13, wherein indicating the first DGI as the recipient for the data related to any of the first subset of the plurality of subscriber sessions comprises ensuring that the one or more BGP update messages encode an identification of the first DGI in a NEXT_HOP path attribute.

15. The system according to claim 12, wherein the at least one processor is further configured to:

receive, from the load balancer, an indication of a second subset of the plurality of subscriber sessions assigned to the first DGI, wherein the second subset of the plurality of subscriber sessions comprises at least two subscriber sessions, and wherein each subscriber session of the second subset of the plurality of subscriber sessions is uniquely identified by a Mobile Access Gateway (MAG), LMA and Downlink and Uplink GRE Key of the Mobile IP and Proxy Mobile IPv6 tunnel between a PDN gateway and a High-Rate Packet Data Serving Gateway (HSGW) or trusted non-3GPP IP access gateway of the LTE network of the mobile IP or proxy mobile IP; and initiate a second advertisement of the LMA IP address and Downlink and Uplink GRE Key of the second subset of the plurality of subscriber sessions, the second advertisement indicating the first DGI as a recipient for data provided to the PDN gateway and related to any of the second subset of the plurality of subscriber sessions.

16. A system for assisting load-balancing of subscriber sessions in a distributed gateway (DG) of a long-term evolution (LTE) network, where the DG includes a plurality of distributed gateway instances (DGIs), the system comprising:

at least one memory element configured to store computer executable instructions, and at least one processor coupled to the at least one memory element and configured, when executing the instructions, to:

receive a first advertisement of an Internet Protocol (IP) address of a Local Mobility Anchor (LMA) of the DG and Downlink and Uplink Generic Routing Encapsulation (GRE) Key(s) assigned to a first subset of a plurality of subscriber sessions, the first subset of the plurality of subscriber sessions assigned to a first DGI of the plurality of DGIs, wherein the first subset of the plurality of subscriber sessions comprises at least two subscriber sessions, the first advertisement indicating the first DGI as a recipient for data provided to the DG and related to any of the first subset of the plurality of subscriber sessions;

store an association between the LMA IP address and Downlink and Uplink GRE Key(s) of the first advertisement and the first DGI;

receive a packet comprising data related to a subscriber session of the first subset of the plurality of subscriber sessions;

identify, from the received packet, a LMA IP address and Downlink and Uplink GRE Key(s) assigned to the subscriber session to which the data in the packet relates;

identify, from the stored association, that the identified LMA IP address and Downlink and Uplink GRE Key(s) are associated with the first DGI; and forward the data of the received packet to the first DGI associated with the identified LMA IP address and Downlink and Uplink GRE Key(s).

17. The system according to claim 16, wherein the first advertisement comprises one or more Border Gateway Protocol (BGP) update messages comprising network layer reachability information (NLRI) for the first subset of the plurality of subscriber sessions.

18. The system according to claim 17, wherein the first advertisement indicating the first DGI as the recipient for the data related to any of the first subset of the plurality of subscriber sessions comprises the first advertisement encoding an identification of the first DGI in a NEXT_HOP path attribute of the one or more BGP update messages.

19. The system according to claim 18, wherein the identification of the first DGI comprises an IP address of the first DGI.

20. The system according to claim 16, wherein the at least one processor is further configured to:

perform load-balancing to distribute the plurality of subscriber sessions between two or more DGIs.

* * * * *